J. A. MILES.
Tire-Setter.
No. 204,238.　　　　　Patented May 28, 1878.
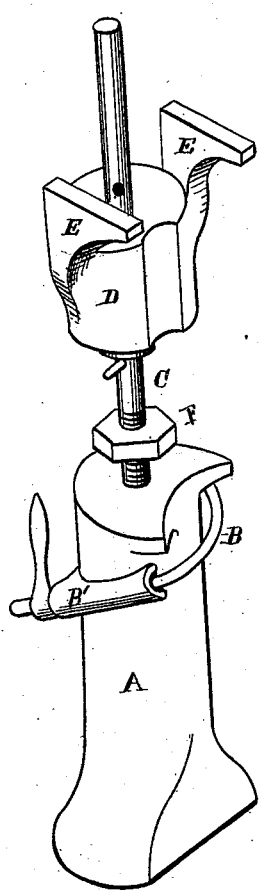
Witnesses
Geo. H. Strong.
Frank A. Brooks.
Inventor
John A. Miles
by Dewey & Co.
Attys.

UNITED STATES PATENT OFFICE.

JOHN A. MILES, OF RIO VISTA, CALIFORNIA.

IMPROVEMENT IN TIRE-SETTERS.

Specification forming part of Letters Patent No. 204,238, dated May 28, 1878; application filed April 1, 1878.

*To all whom it may concern:*

Be it known that I, JOHN A. MILES, of Rio Vista, county of Solano, and State of California, have invented a Tire-Setter; and I do hereby declare the following to be a full, clear, and exact description thereof, reference being had to the accompanying drawing.

My invention relates to that class of devices used for setting or tightening tires of vehicle-wheels by expanding the fellies and without cutting or upsetting the tire.

I call my device a "tire-setter;" and it consists in the novel construction and arrangement of a clamping-post and a peculiarly-curved hook-bolt, in combination with a thread-bar or screw-bolt and loose head, for the purpose of forcing out the felly, as described in the following specification and drawing, in which—

Figure 1 is a view of my device.

A is a clamping-post, supporting a hook-bolt, B, that passes through a lug, socket, or portion of the post. The hook part B clamps the spoke of a wheel, and is drawn tight by means of a common or hand nut.

This hook may be covered with leather, and also a curved portion of the post just above it, so as to receive the spoke to be clamped without bruising or chafing it.

The peculiarity of my clamp is in the manner of its operation. The stem passes through the post A at an angle, as shown at B', and the hook or curved portion B thus clasps the spokes at an incline, so that when the strain is brought upon it, it holds more firmly by an increase of pressure, and will not allow the post to press upon the hub, as this would tend to draw the spoke from the hub. The clamping-post A also supports a threaded bar, spindle, or screw-bolt, C, that passes through it, and is forced outward when turned in a screw-threaded nut in the interior of the post by means of a wrench acting on a head, F, formed on the screw-bar, near its center. The upper portion of this screw-bar is smooth and round, so as to receive and pass through a movable head, D, which it supports and moves forward by means of a pin and washer at a bearing against the back end of the head, but permitting the screw-spindle to turn independently of the head. This spindle C has holes at different distances apart, so that the pins and washers may be moved to support the head D at any point to suit different sizes of wheels.

Two lugs, E, project from the head D and extend beneath the felly, so as to act upon it on each side of the spoke to which the device is clamped, and thus bearing against the fellies of the wheel. These are expanded by the action of the screw so as to be spread out and fill the spaces and fit closely against the tire. The spaces between the felly and the shoulder of the tenon of the spoke are then to be filled by suitable wedges or washers.

The base of the clamping-post is placed near the hub by the side of a spoke, and the clamp-hook or hook-bolt made fast to the spoke; and when the screw-bar is turned, forcing the head D against the fellies, the draft will be in a direct line of the spoke, thus guarding against breaking off the tenon of the spoke or splitting the felly.

I am aware that various devices have been employed for expanding the felly in which a screw has been the motive force, this screw acting upon a link suspended outside of the wheel, so as to give a drawing force upon the felly; but I am not aware that the direct pressure of an operating-head, forced out by a screw acting in a line with the point of support, has been employed, nor that my peculiar holding-clamp has been shown.

More than one machine may be employed upon the same wheel, if desired, so as to expand the fellies in every direction at once; but the use of one will usually be sufficient, and by allowing the wheel to turn upon its axle, any departure from a truly-centered circle is easily rectified.

I am aware that to tighten tires by expanding the fellies is not new; and also that a stationary screw-bolt with a movable nut is old.

What I claim, therefore, and desire to secure by Letters Patent, is—

1. The clamping-post A, secured to the wheel-spoke and provided with an interior stationary nut, in combination with the head D, having the lugs E, and the rotating screw-spindle C, with its fixed operating enlargement F, the head being adjustable upon the spindle by a pin and washer, substantially as herein described.

2. The clamping-hook B, having its stem passing through the socket or guide at an incline, B', so that the clamp will be drawn tighter by the strain brought upon it, substantially as herein described.

In witness whereof I have hereunto set my hand and seal.

JOHN A. MILES. [L. S.]

Witnesses:
FRANK A. BROOKS,
CHARLES D. COLE.